United States Patent

[11] 3,576,553

[72] Inventor Friedrich R. Hertrich
 Boulder, Colo.
[21] Appl. No. 724,996
[22] Filed Apr. 29, 1968
[45] Patented Apr. 27, 1971
[73] Assignee International Business Machines Corporation
 Armonk, N.Y.

[54] DATA TRANSDUCER POSITIONING SERVO UTILIZING COMPENSATION NETWORK AND PHASE-DISPLACED SERVO SIGNAL PAIRS OF LIKE FREQUENCY
19 Claims, 20 Drawing Figs.

[52] U.S. Cl. .................................................... 340/174.1, 179/100.2
[51] Int. Cl. ............................................. G11b 21/10
[50] Field of Search ....................................... 340/174.1 (B); 179/100.2 (MI), 100.2 (S)

[56] References Cited
UNITED STATES PATENTS
2,709,204  5/1955  Holmes ........................ 340/174.1
3,185,972  5/1965  Sippel ........................... 340/174.1
3,263,031  7/1966  Welsh ........................... 340/174.1
3,404,392  10/1968  Sordello ....................... 340/174.1

FOREIGN PATENTS
925,603  5/1963  Great Britain ................. 340/174.1

Primary Examiner—Bernard Konick
Assistant Examiner—Vincent P. Canney
Attorney—Fraser & Bogucki ABSTRACT: A system is provided for aligning data transducers carried by a common mechanical element with data tracks on a movable record member. Servo transducers at the opposite ends of the common mechanical element sense adjacent pairs of servo track signals on the record member to provide error signals. The error signals are selectively attenuated by a network of resistors to compensate for variations due to hygroscopic record member expansion and the like, while biasing voltages imposed on the various terminals of the resistor network by a plurality of bridge circuits compensate for mislocations of the data transducers on the mechanical element. Problems due to noise, variations in flying height and the like may be eliminated by an arrangement in which the adjacent servo track signals are of like frequency but different phase, the phase of both signals reversing at intervals along the length of the servo tracks.

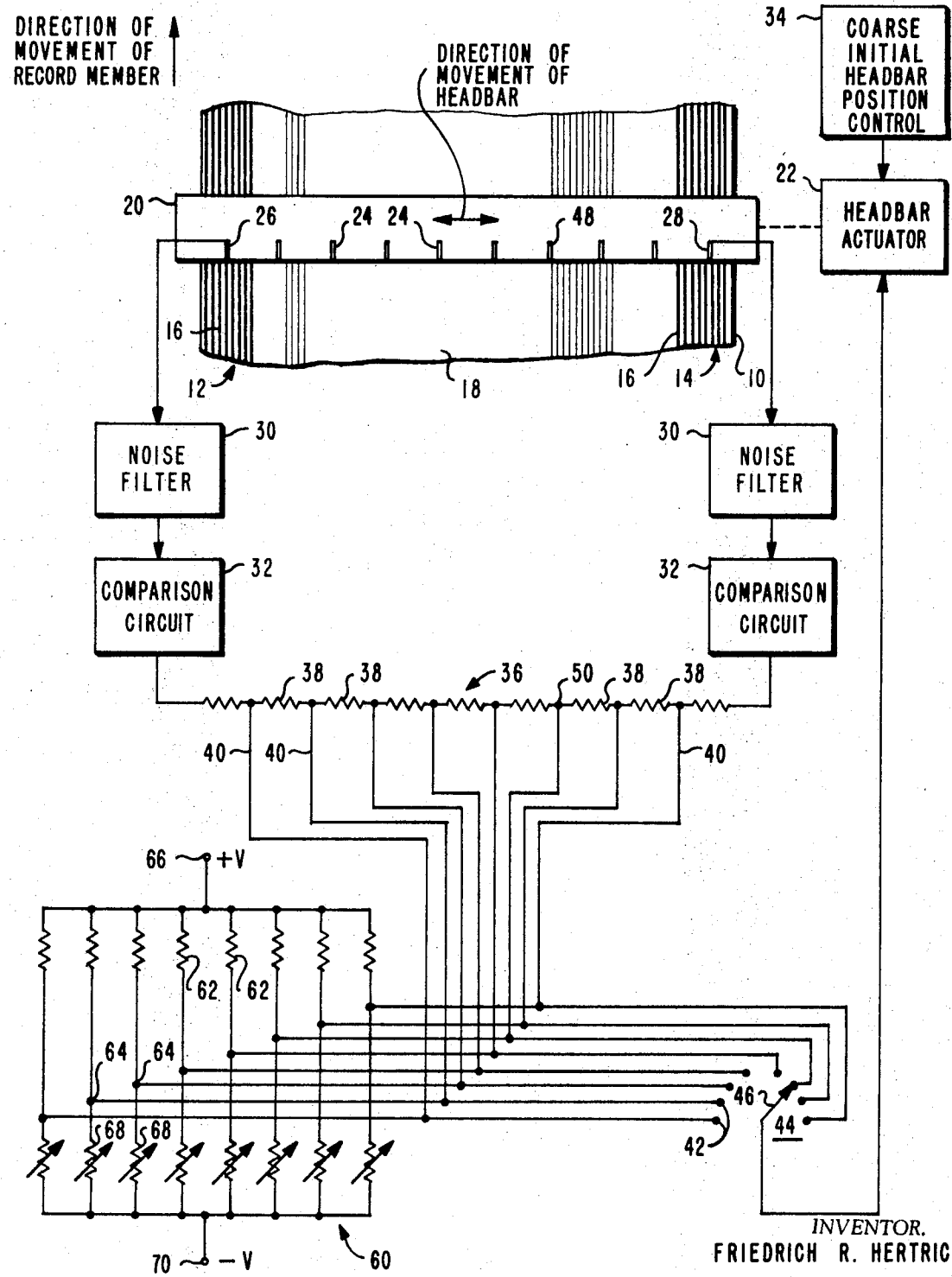

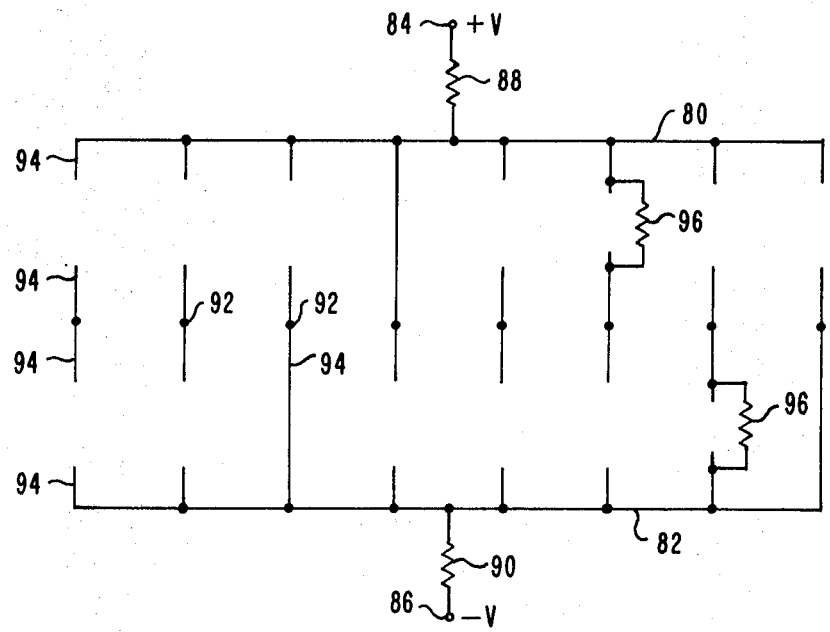
FIG.−2
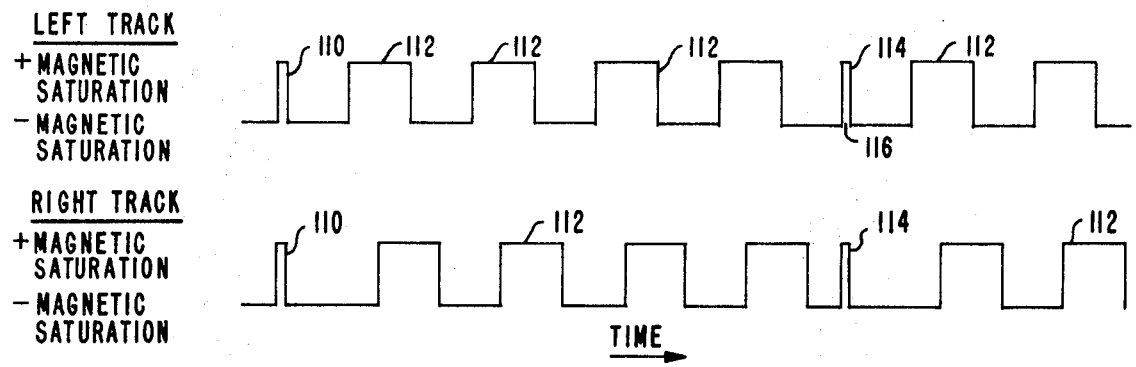
FIG.−3
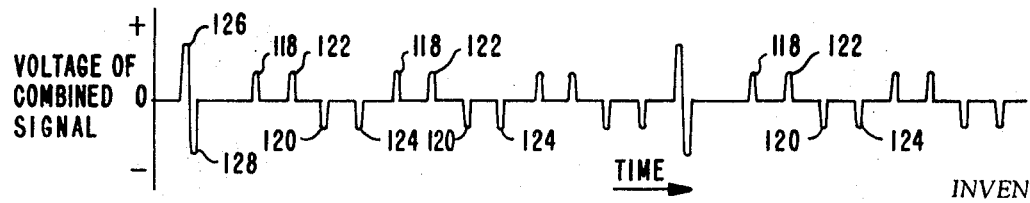
FIG.−4
INVENTOR.
FRIEDRICH R. HERTRICH
BY Fraser and Bogucki
ATTORNEYS

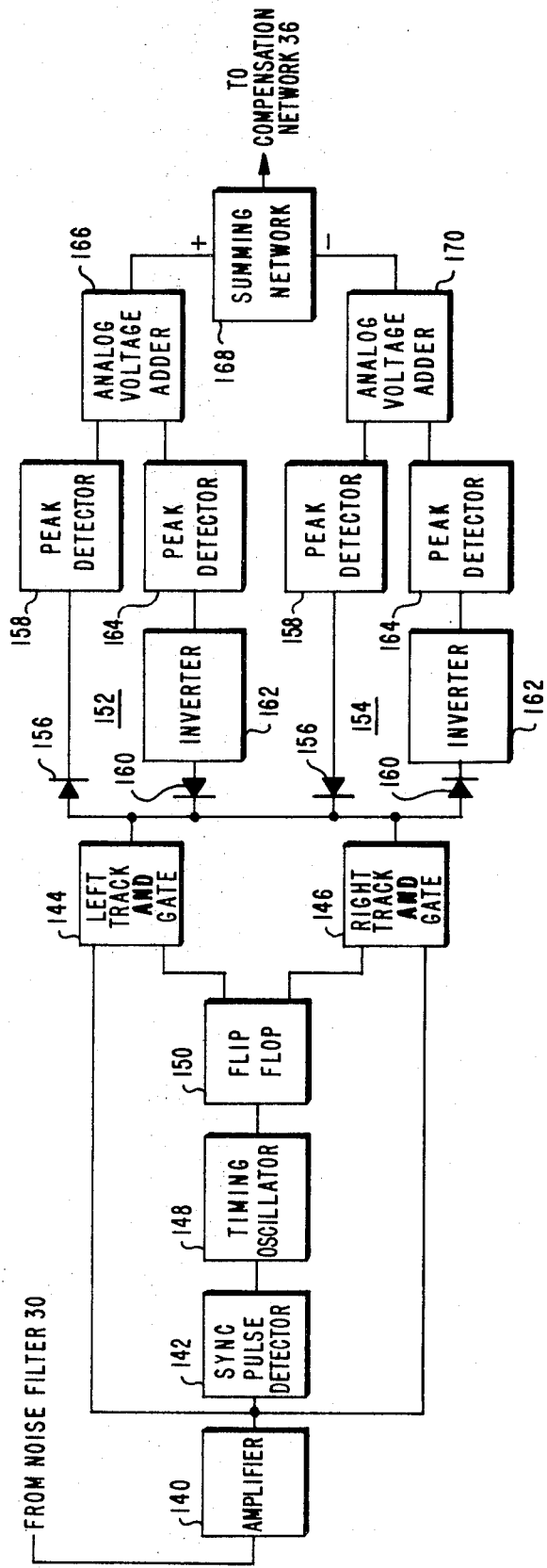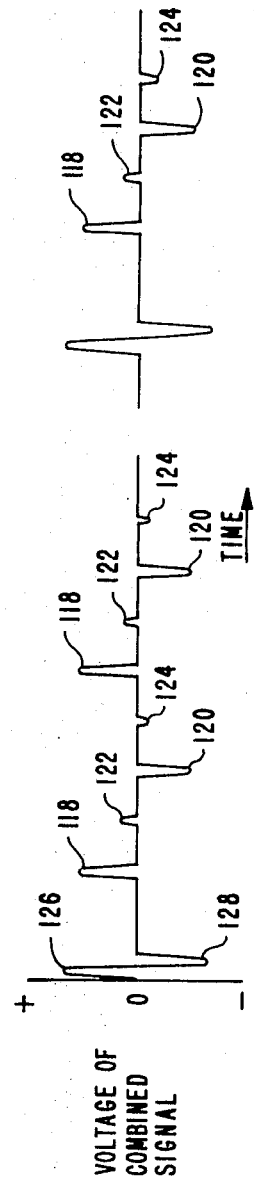

DATA TRANSDUCER POSITIONING SERVO UTILIZING COMPENSATION NETWORK AND PHASE-DISPLACED SERVO SIGNAL PAIRS OF LIKE FREQUENCY

BACKGROUND OF THE INVENTION

1. Field of the Invention

The present invention relates to systems for controlling the position of a movable member, and more particularly to data transducer positioning servosystems in which data transducers carried by a common mechanical element are aligned with selected data tracks on a record member.

2. Description of the Prior Art

Many data processing systems require storage of a relatively large quantity of data in an arrangement of limited physical size. Data storage units which are employed in such applications may assume a number of different basic forms, and typically comprise an arrangement in which one or more transducers are employed to sense representations of the data along the tracks of a movable record member such as a disc, drum, tape or strip. The efficiency of any data storage unit is dependent at least in part upon the density with which the data may be recorded. Where parallel tracks are used to store the data, the minimum distance between tracks is typically determined in part by the degree of accuracy with which one or more transducers can be aligned with selected ones of the tracks.

Various data transducer positioning means have been employed in order to increase alignment precision. Prior art techniques include the recording of servo signals along tracks parallel with the direction of movement of a record member. The relative strengths of signals sensed by a servo transducer from an adjacent pair of the servo tracks may then be used to align a common headbar carrying a plurality of magnetic data heads with the record member, as shown for example in U.S. Pat. No. 3,263,031 of Welsh. Such prior art techniques generally provide acceptable accuracy, particularly if expansion or contraction of the record member and common headbar are minimal.

A problem arises, however, in the more typical case where the common headbar and record member undergo thermal expansion or contraction in unequal amounts due to the different materials used in their construction and to the differences in their physical configurations. If such is the case, most if not all of the data transducers are unable to accurately follow corresponding data tracks even though the servo transducer is precisely centered between the selected pair of servo tracks. Where the record members are made of certain plasticlike materials such as Mylar, hygroscopic expansion and contraction of the record members make alignment precision even more difficult to achieve.

The effectiveness of the prior art alignment techniques discussed above further depends upon the precision manufacturing of the common headbar. Mislocation of one or more of the data heads along the length of the headbar can result in the misalignment of such heads despite the accurate positioning of the servo transducer between the selected adjacent pair of servo tracks.

Apart from the general inability of the above discussed prior art alignment techniques to compensate for numerous physical variations which may occur, other factors may render such techniques unacceptable for certain applications where relatively high accuracy is required. Those arrangements which include servo signals of different frequency in adjacent servo tracks, for example, usually employ frequency filters or similar means to separate the sensed components of different frequency. The frequency filters necessarily have different band-pass characteristics, resulting in unequal noise rejection. The filters, moreover, present different impedances to noise in the respective frequency passbands, and the resultant unequal attenuation of noise reduces the accuracy of the resulting error signal. Variations in the speed of the record member relative to the servo transducer and in the flying height (the distance between the record member and the transducer) cause changes in the relative detected amplitudes of the adjacent servo tracks, again contributing to alignment error.

Prior art arrangements which use a common servo frequency avoid some of the problems of the two frequency systems. Single frequency systems, however, are still prone to noise problems, particularly where the noise has a frequency equal to, or a multiple of, or a submultiple of the common servo signal frequency.

BRIEF SUMMARY OF THE INVENTION

In brief, the present invention provides a system in which data transducers carried by a common mechanical element such as a headbar are accurately aligned with selected ones of a plurality of data tracks on a record member which is movable relative to the mechanical element. A pair of servo transducers carried at the opposite ends of the mechanical element sense servo signals recorded in adjacent pairs of tracks on the record member to provide error signals to the opposite ends of a serial network of resistors. Each of the junctions between an adjacent pair of the resistors corresponds to the physical location of a different one of the data transducers, the value of each resistor corresponding to the distance between two of the data transducers on the common mechanical element. The common mechanical element is laterally positioned relative to the record member by an electromechanical transducer to align a selected one of the data transducers with a particular data track on the record member, the resistor junction which corresponds to the particular data transducer being coupled to the electromechanical transducer to provide a single error signal thereto. The resistor network attenuates the error signals from the two different servo transducers in accordance with the relative distances between the selected data transducer and the servo transducers to compensate for thermal and hygroscopic expansion or contraction.

In accordance with a particular aspect of the invention, variations in the physical location of the data transducers along the mechanical element due to manufacturing tolerances and the like are compensated for by an arrangement which imposes a desired bias voltage on each of the resistor pair junctions. The bias voltage which represents the direction and extent of mislocation of a particular data transducer from a desired location on the mechanical element is combined with the single error signal to compensate for such mislocation. The bias voltage arrangement may comprise fixed and variable resistors coupled between the resistor pair junctions and opposite voltage sources. Alternatively, the arrangement may comprise a printed circuit having opposite common busses coupled to different sources of voltage and couplings between the busses and each of the junctions. The couplings may be left intact or removed and replaced by resistors of desired value.

In accordance with further particular aspects of the invention, servo signals in the adjacent pairs of servo tracks are preferably of like frequency but different phase to present successive pairs of alternately positive-going and negative-going signal excursions to the servo transducers. Each servo transducer accordingly generates a combined signal having components which correspond to the two different servo signals. The components are separated by a timed gating arrangement and integrated to provide a pair of signal amplitudes representing the relative distances between the servo transducer and each of the adjacent pair of tracks. The signal amplitudes are algebraically summed to provide an error signal to the resistive network.

The use of a common servo frequency effects the cancellation of noise and eliminates problems due to variation in the speed of the record member and in flying height. The rejection of noise at any frequency, but particularly at a frequency equal to, or a multiple of, or a submultiple of the common servo signal frequency is further enhanced by synchronizing signals which periodically reverse the phase of the recorded servo signals at intervals along the length of the servo tracks. Each phase reversal reverses the sense of the noise signal effects to cancel the previous effects.

BRIEF DESCRIPTION OF THE DRAWINGS

A better understanding of the present invention may be had from a consideration of the following detailed description taken in conjunction with the accompanying drawings, in which:

FIG. 1 is a combined block, schematic and simplified plan representation of a preferred arrangement of a data transducer positioning servo system in accordance with the invention;

FIG. 2 is a schematic representation of an alternative form of bridge circuit which may be used in the arrangement of FIG. 1;

FIG. 3 is a graphical representation of a preferred form of recorded servo signals which may be used in the arrangement of FIG. 1;

FIG. 4 is a graphical representation of typical sensed waveforms which are provided by the servo signals of FIG. 3;

FIG. 5 is a block diagram of a comparison circuit for use in the arrangement of FIG. 1;

FIG. 6 is a graphical representation of typical sensed waveforms which are provided by the servo signals of FIG. 3 when the servo transducer is not centered relative to the adjacent pair of servo tracks;

DETAILED DESCRIPTION

Figure 7:
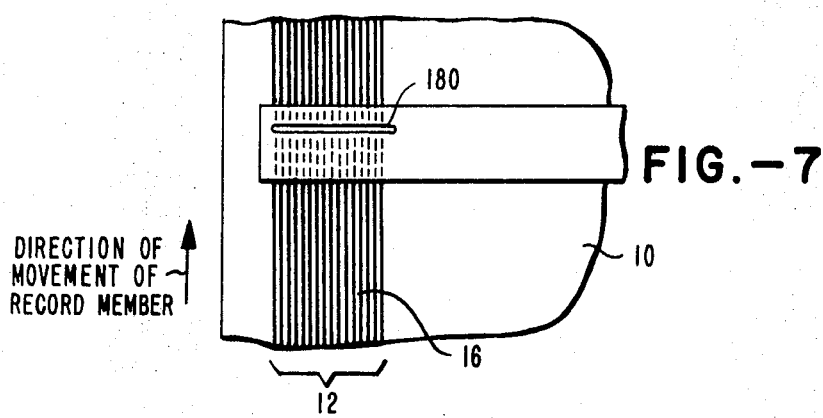
FIG. 7 is a simplified plan representation of one arrangement which may be used to record servo signals of the type illustrated in FIG. 3.

One particular arrangement of a data transducer positioning servosystem in accordance with the invention is illustrated generally in FIG. 1. A movable record member 10, which is illustrated as a magnetic strip but which may alternatively assume other appropriate forms, such as a tape, disc or drum, has first and second sets 12, 14 of generally parallel, spaced-apart servo tracks 16 recorded adjacent the opposite edges thereof in the direction of movement of the record member 10, and a plurality of generally parallel spaced-apart data tracks 18 recorded between the servo track sets 12, 14 and parallel to the tracks 16 therein. A common mechanical element or transducer 20 extends across the width of the record member 10 and is movable in a lateral direction relative thereto by a mechanically coupled actuator 22. The actuator 22 may comprise any appropriate electromechanical transducer such as a voice coil which moves the mechanical element 20 in a direction and to an extent determined by the sense and magnitude of an applied signal. The common mechanical element 20 is shown as comprising an elongated headbar having a plurality of data transducers 24 in the form of magnetic heads mounted in spaced-apart relation along a common axis, and first and second servo transducers 26, 28 in the form of magnetic heads mounted along the common axis at the opposite ends of the data transducers 24 and adjacent the opposite ends of the headbar and the first and second servo track sets 12, 14 respectively.

The servo transducers 26, 28 and the data transducers 24 are illustrated as comprising magnetic heads for purposes of illustration only. In actual practice, such transducers may assume any appropriate form, such as, for example, photoelectrical sensing devices, and the common mechanical element 20 may assume any appropriate form so long as it is capable of laterally positioning the servo transducers and the data transducers relative to the servo and data tracks. The record member 10, moreover, need not be one which undergoes linear motion, and a disc which undergoes circular motion, for example, may be used so long as the headbar 20 is radially positioned relative to the disc.

If the individual servo tracks 16 and data tracks 18 are spaced apart from one another by approximately equal distances, then the number of servo tracks in the sets 12, 14 determines the number of different data tracks which each of the data transducers 24 is capable of tracking. By causing each of the servo transducers 26, 28 to track on a particular servo track 16, or alternatively, between a selected adjacent pair of the servo tracks 16, a limited number of the data transducers 24 can be used to handle a relatively large number of data tracks 18.

If the record member 10 and headbar 20 are assumed to be dimensionally stable, and factors such as thermal and hygroscopic expansion or contraction are neglected, then a single servo transducer and associated servo track set may be used to provide an error signal to the headbar actuator 22. Similarly, where the record member 10 and headbar 20 undergo dimensional distortion in approximately equal amounts, a single servo transducer and associated servo track set will suffice. In the more typical case however, the record member 10 and headbar 20 undergo thermal expansion or contraction in unequal amounts due to the different materials used in their construction and to the differences in their physical configuration. Moreover, where the record member 10 is fabricated of plasticlike materials such as Mylar, hygroscopic expansion and contraction of the record member can become a very serious problem. In such instances a pair of servo transducers and associated servo tracks sets are preferably used in combination with a compensation network to provide needed accuracy as taught by the present invention.

As previously mentioned error signals may be generated by arrangements which attempt to align each of the servo transducers 26, 28 with a particular one of the servo tracks 16 within each of the sets 12, 14. Frequency filters, for example, may be used to separate a servo track signal of one frequency from signals of different frequency corresponding to adjacent servo tracks. Arrangements which attempt to align the servo transducers with the imaginary centerline between adjacent pairs of the servo tracks 16 are generally preferred however, particularly where the rates of expansion or contraction of the record member 10 and headbar 20 are considerably different.

The arrangement of FIG. 1 is accordingly illustrated and hereafter described as including circuitry which generates error signals representing the deviation of each of the servo transducers 26, 28 from the imaginary centerline between a selected adjacent pair of the servo tracks 16 in the corresponding set. Each of the transducers 26, 28 generates a combined signal having individual components which correspond to the different ones of the signals in the adjacent servo track pair in response to movement of the record member 10 relative to the headbar 20. The combined signal is filtered by a low-pass noise filter 30 to remove high frequency noise therefrom, then passed to a comparison circuit 32 wherein the individual components from the two different servo tracks are separated and compared to provide an error signal. One such arrangement is shown in copending U.S. Pat. application Ser. No. 631,103, filed Apr. 14, 1967 by Frank J. Sordello, now U.S. Pat. No. 3,404,392, and assigned to the assignee hereof.

The servo transducers 26, 28 are initially positioned between selected adjacent pairs of the servo tracks 16 by the headbar actuator 22 under the control of a coarse initial headbar position control 34. The initial position control 34 may comprise any appropriate arrangement for initially positioning the headbar 20 in response to external command signals, a typical example being a linear variable differential transformer which is responsive to an address from a data processing unit corresponding to a selected one of a plurality of different incremental positions representing the different adjacent pairs of the servo tracks 16.

If the record member 10 is assumed to have undergone a much greater expansion than the headbar 20 due to hygroscopic expansion thereof, for example, and if the error signals from the two different servo transducers 26, 28 are algebraically combined to provide a single error signal to the headbar actuator 22, then the headbar 20 will be positioned with the transducer 26 closer to the right track of its associated servo track pair and the servo transducer 28 closer to the left track of its associated servo track pair. Data transducers 24 located close to the center of the headbar 20 will accurately follow selected ones of the data tracks 18. Data transducers 24 which are located along the left-hand or right-hand portions of the headbar 20 however, will respectively lie to the right and to the left of selected ones of the data tracks 18 which they are to follow.

In accordance with the invention the misalignment of each of the data transducers 24 relative to selected data tracks 18 which they are to follow is compensated for by a compensation network 36 which attenuates the error signals from the servo transducers 26, 28 in accordance with the distance between a selected one of the data transducers 24 and the servo transducers 26, 28. The error signals from the respective comparison circuits 32 are applied to the opposite ends of a plurality of serially coupled resistors 38, each of which has a value corresponding to the distance between an adjacent pair of the transducers 24, 26, 28 on the headbar 20. The junction between each adjacent pair of the resistors 38 is coupled by a lead 40 to a different terminal 42 of a multiterminal rotary switch 44, the wiper arm 46 of which is coupled to provide a single error signal to the headbar actuator 22. The rotary switch 44 is shown and described for ease of illustration. In actual practice high speed electronic switching devices such as diode or transistor switching arrangements are more typically used.

If a particular one 48 of the data transducers 24 is to be correctly aligned with a selected one of the data tracks 18, a terminal 50 within the compensation network 36 corresponding to the physical location of the transducer 48 along the length of the headbar 20 is coupled to the headbar actuator 22 by the wiper arm 46 of the rotary switch 44. The error voltage from the servo transducer 26 is attenuated by the six resistors 38 to the left of the terminal 50, while the error voltage from the servo transducer 28 is attenuated by the three resistors 38 to the right of the terminal 50. The resulting voltage at the terminal 50 is of a proper sense and magnitude to align the selected data transducer 48 with a particular one of the data tracks 18 via the headbar actuator 22. In similar fashion, the wiper arm 46 of the switch 44 may be positioned at any of the other terminals 42 to provide precise tracking of a corresponding one of the data transducers 24. The resistors 38 may be of any appropriate value and are typically of like value where the distances between adjacent pairs of the data transducers 24 are substantially equal. If data is to be read simultaneously by more than one of the data transducers 24, the wiper arm 46 is coupled to the junction corresponding to the transducer nearest the midpoint between the two end data transducers which are to be used.

Minor mislocations of the transducers along the length of the headbar 20 are inevitable because of mass production manufacturing tolerances. While less common, slight differences in the electrical characteristics of the transducers 24 and their associated circuitry are also possible. Common headbar precision can be increased by tightening manufacturing tolerances, but this significantly increases the manufacturing costs per unit. In addition, the yield in manufacturing multiple transducer common headbars is degraded by stringent tolerance requirements.

A network of bridge circuits 60 illustrated in FIG. 1 may be employed in accordance with the invention to compensate for transducer location errors and for slight differences which may exist in the electrical characteristics of the transducers or their associated circuitry. Each of the bridge circuits 60 includes a resistor 62 of fixed value coupled between a terminal 64 and a common source 66 of positive voltage, and a variable resistor 68 coupled between the terminal 64 and a common source 70 of negative voltage. The terminal 64 of each bridge circuit 60 is coupled to a different one of the terminals 42 of the rotary switch 44 to impose a variable biasing voltage thereon. The biasing voltage corresponds to the voltage of the terminal 64 and is of zero value if the resistance of the variable resistor 68 is set to equal that of the fixed resistor 62 and the voltage sources 66 and 70 are of equal absolute value.

If a particular data transducer is determined to be properly located along the length of the headbar 20, the biasing voltage at the corresponding resistor junction is set to zero value since no position compensation is needed. However, where the particular data transducer is located to the left of or to the right of where it should ideally be located, the variable resistor 68 within the corresponding bridge circuit 60 is adjusted to provide a bias voltage at the corresponding switch terminal 42, the sense of the bias voltage representing the direction in which the transducer is located relative to its ideal position and the magnitude of the voltage representing the extent to which the transducer is mislocated.

As a part of the manufacturing process, each completed headbar can be checked against a prerecorded reference medium which has servo tracks written in the recording space. Thus, independent from the servosystem, the signals detected by each transducer may be displayed on an oscilloscope. Each variable resistor 68 need be tuned only once at the factory for precise track registration. Of course, if the servo signal tracking characteristics of the headbar should change subsequently, the variable resistors 68 can be readjusted if a suitable calibration reference is available.

The bridge circuits 60 in the arrangement of FIG. 1 provide a wide range of possible bias voltage values because of the adjustable resistance feature. A somewhat simpler and less expensive alternative arrangement of the bridge circuits 60 is illustrated in FIG. 2. The arrangement of FIG. 2 which may be readily constructed in the form of a printed circuit board lends itself to applications in which it is desired to limit the amount of tracking error to a fixed percentage, for example 20 percent, of the worst case location tolerances of the transducers 24. If the worst case location tolerances amount to ±0.002 inch for example, and the correction criterion is 20 percent, then each transducer must be correctable at least to within ±0.0004 inch of its ideal location along the headbar 20. This may be accomplished by providing each of the junctions between the resistors 38 as shown in FIG. 1 with a bias voltage of zero value, a positive or negative voltage corresponding to 0.0016 inch on the headbar, or a positive or negative voltage corresponding to 0.0008 inch on the headbar.

Such biasing voltages are provided by a printed circuit arrangement including a pair of common bus bars 80 and 82 respectively coupled to positive and negative sources of voltage 84 and 86 through dividing resistors 88 and 90 and to terminals 92 by etched patterns forming electrical conductors 94. Each of the terminals 92 is coupled to a different one of the junctions between the resistors 38 to impose a selected bias voltage thereon. A bias voltage of zero value is provided at the terminals 92 by cutting the land areas of the printed circuit which comprise the etched conductors 94 between the selected terminal 92 and the bus bars 80 and 82. In this manner a voltage of zero value is established at the associated terminal 92 regardless of the voltages of the sources 84, 86 or the common buses 80, 82. A plus or minus voltage of value corresponding to 0.0016 inch distance along the headbar 20 is provided at the terminals 92 by cutting the conductor 94 between the terminal and one of the bus bars 80, 82 and leaving the other conductor 94 intact. This voltage the value of which is determined by the voltages at the sources 84 and 86 and the resistors 88 and 90 will be positive in value if the conductor 94 between the terminal and the bus bar 80 is left intact, and negative in value if the conductor 94 between the terminal and the bus bar 82 is left intact. A plus or minus voltage corresponding to a distance of 0.0008 inch along the headbar 16 is provided at the terminals 92 by cutting both of the associated conductors 94 and coupling a resistor 96 between the terminal 92 and one of the bus bars 80, 82. Again the polarity of the voltage at the terminal 92 is determined by whether the terminal is coupled to the bus bar 80 or the bus bar 82.

The arrangement of FIG. 2 provides a simple and inexpensive way in which a headbar 20 may be calibrated. Each of the transducers 24 is calibrated by cutting one of the conductors 94, by cutting both of the conductors 94, or by cutting both of the conductors 94 and adding a resistor 96. In actual practice it has been found that about half of the transducers on a given headbar require a resistor 96 for correction, the remaining ones of the transducers requiring only that one or both of the associated conductors 94 be cut.

As previously mentioned the arrangement of FIG. 1 can be used with any appropriate servo signal systems for tracking on a particular servo track or between an adjacent pair of servo tracks. For certain applications however, typical prior art servo tracking systems may be unsatisfactory. Systems in which a servo transducer tracks between an adjacent pair of tracks having servo signals of different frequency, for example, may not provide needed accuracy for a number of reasons. For one thing, the filters required to separate the signal components of different frequency necessarily have different band-pass characteristics resulting in unequal noise rejection. Such filters moreover present different impedances to noise in the respective frequency passbands, and the resultant unequal attenuation of noise reduces alignment precision. Variations in the speed of the record member relative to the servo transducers, and variations in flying height, also contribute to inaccuracy.

A servo signal arrangement which is preferably used in the arrangement of FIG. 1, and which eliminates the above-noted problems, is illustrated in FIG. 3. FIG. 3 is a plot of the servo signals recorded on an adjacent pair of the servo tracks 16 within the sets 12, 14 as a function of time, the upper plot of FIG. 2 corresponding to the servo track on the left-hand side of the associated servo transducer and the lower plot corresponding to the servo track on the right-hand side of the servo transducer. The left and right track servo signals include a synchronizing pulse 110 of relatively short duration, the pulses in the two different tracks being in phase and thus occurring simultaneously. The synchronizing pulses 110 are followed by a series of substantially rectangular or square wave pulses 112 of like frequency which are phase displaced relative to one another, the pulses 112 of the right servo track signal lagging those of the left servo track signal by 90 electrical degrees. The series of square wave pulses 112 are followed by another pair of synchronizing pulses 114 which commence further series of the square wave pulses 112. The occurrence of a synchronizing pulse in each of the tracks interrupts the preceeding series of square wave pulses 112, and a new series of the pulses 112 commences a fixed interval of time after the occurrence of the synchronizing pulse. The signal in the left servo track, for example, would have a positive-going excursion at the point 116 in the absence of the new synchronizing pulse 114. However, in the presence of the pulse 114, such positive-going excursion does not occur until a fixed time interval has elapsed, and the phase of the series of pulses 112 is thereby reversed. Similarly, the occurrence of a positive-going excursion of the right track servo signal is delayed a fixed amount by the presence of a new synchronizing pulse 114, and the phase of the series of pulses 112 in the right track signal is also reversed. Each occurrence of a sync pulse along the length of the servo tracks reverses the phase of that portion of the servo signal immediately following such sync pulse.

While only two servo track signals are shown in FIG. 2 for simplicity, it should be understood that the synchronizing pulses in all servo tracks are in phase, that the pulses 112 in each track reverse in phase upon the occurrence of a synchronizing pulse, and that the pulses 112 in any adjacent pair of tracks are phase displaced relative to one another. Furthermore, while a relative phase displacement of 90° is shown and described for simplicity of illustration, it should be understood that other displacements can be used within the scope of the invention.

The square wave pulses 112 may be conveniently recorded using an NRZI format, the successive increments of the tracks being driven into magnetic saturation of opposite sense under the control of an appropriate input sequence such as 1, 0, 1, 0, 1, 0. servo signals of generally rectangular waveform are preferred since the magnetic transitions thereof are easily sensed and minimize unwanted signals such as noise. Other signal waveforms and recording techniques may be used however, so long as positive-going and negative-going transitions arranged in a predetermined sequence are provided.

As the servo transducer is caused to track along the centerline between the left and right servo tracks in response to movement of the record member 10 relative to the headbar 20, the signals recorded within the two different tracks are sensed and a single combined signal is provided by the transducer, as shown in FIG. 4. It will be noted that the combined signal comprises two different sets of pulses which are essentially the derivatives of the rectangular pulses 112 in the two different servo tracks. The leading and trailing edges of the square wave pulses 112 within the left servo track provide positive and negative pulses 118 and 120 respectively, while the square wave pulses 112 in the right servo track provide positive and negative pulses 122 and 124, respectively. The phase displacement of the servo signals in the two different servo tracks provides for the time displacement of the sensed pulses 118, 120, 122 and 124, alternate ones of the pulses corresponding to one of the servo tracks and the remaining ones of the pulses corresponding to the other one of the servo tracks. Successive pairs of alternately positive and negative pulses are thus provided in response to movement of the record member 10 relative to the headbar 20, the pulses in one pair representing the positive-going signal excursions in the two different servo tracks and the pulses in the immediately following pair representing the negative-going signal excursions in the servo tracks.

The synchronizing pulses 110 are sensed simultaneously to provide positive and negative pulses 126 and 128 of amplitudes substantially greater than those of the pulses 118, 120, 122 and 124. Since it is assumed for purposes of the present example that the servo transducer is tracking the centerline between the left and right servo tracks, the relative strengths of the signals sensed by the transducer from the two different tracks are substantially equal, and the resulting pulses 118, 120, 122 and 124 are of substantially equal amplitude.

As will become more fully apparent from the discussion to follow, the left servo track pulses 118 and 120 have an amplitude which is greater than that of the right servo track pulses 122 and 124, when the servo transducer 26 is closer to the left track than to the right track, and vice versa.

One example of a comparison circuit 32 for separating and processing the individual track components from the combined signal of FIG. 4 is illustrated in FIG. 5. The noise filter 30 shown in FIG. 1 removes high frequency noise from the combined signal and passes the signal to an amplifier 140 for amplification. The amplified signal is applied to the input of a sync pulse detector 142 and to one of the inputs of a left track AND gate 144 and a right track AND gate 146. The sync pulse detector 142 responds to the positive and negative sync pulses 126 and 128 shown in FIG. 4 to adjust the phase of a timing oscillator 148. The detector 142 may comprise any appropriate circuit which responds to the sync pulses 126, 128 to the exclusion of other signals, and may, for example, comprise an amplitude detector which responds only to the greater amplitudes of the sync pulses 126, 128 and not to the pulses 118, 120, 122 or 124. A flip-flop 150 is driven by the oscillator 148 to alternately enable a second input of first one and then the other of the AND gates 144 and 146.

The sync pulse detector 142 and timing oscillator 148 provide one example of an external timing arrangement which functions in response to the receipt of sync pulses to gate the component pulses 118, 120, 122, 124 from the two different servo tracks into separate processing channels 152 and 154. The phase of the oscillator 148 is controlled by the detector 142 to insure that the state of the flip-flop 150 is changed in timed relation with the occurrence of pulses from the separate servo tracks. Thus, when the pulses 118 and 120 are received, the left track AND gate 144 is enabled to pass these pulses to the left track channel 152. Similarly, when the pulses 122 and 124 are received, the right track AND gate 146 is enabled to pass these pulses to the right track channel 154.

The positive pulses 118 from the left servo track are passed by a diode 156 to a peak detector 158 where they are integrated. The negative pulses 120 from the left servo track are passed by a diode 160 to an inverter 162 for inversion, and then integrated by a peak detector 164. The outputs of the two peak detectors 158 and 164, which are both positive in sense, are summed in an analog voltage adder 166 and passed to one input of a summing network 168. The positive and negative pulses 122 and 124 from the right servo track are integrated in the right processing channel 154 in similar fashion. However, since the diodes 156 and 160 are oppositely poled, the output voltages from the peak detectors 158 and 164 are both negative. The negative voltages are added in an analog voltage adder 170 and applied to the second input of the summing network 168. The generated signal amplitudes at the positive and negative inputs of the summing network 168 are of equal absolute value when the servo transducer is at the centerline between the servo tracks, and an error signal of zero value is accordingly provided.

If the servo transducer is positioned closer to the left servo track than to the right servo track, the combined signal which will result is illustrated in FIG. 6. Because of the relatively close proximity of the servo transducer to the left servo track, the strength of the signal from the left track is relatively great at the transducer, and the resulting pulses 118 and 120 are of relatively large amplitude. The strength of the right servo signal at the servo transducer is relatively small, and the resulting pulses 122 and 124 are accordingly of relatively small amplitude. The larger pulses 118 and 120 provide a positive signal amplitude at the summing network 168 which exceeds in absolute value the negative signal amplitude at the summing network 168 provided by the smaller pulses 122 and 124. The resulting error signal is positive in sense to drive the headbar 20 and associated servo transducer 26 or 28 in a direction away from the left servo track. The magnitude of the error signal is proportional to the deviation of the transducer from the track pair centerline.

If the servo transducer is positioned closer to the right servo track than to the left servo track, the pulses 122 and 124 are larger than the pulses 118 and 120 and an error signal of negative sense is provided to center the servo transducer 26 or 28 in similar fashion.

For best results, precise control must be exercised in recording the servo signals and the synchronizing signals on the servo tracks 16. FIG. 7 is illustrative of a method for insuring the identity of the shapes, spacings and amplitudes of the synchronizing signals recorded on all servo tracks. All of the synchronizing signals for a given set 12, 14 of the servo tracks are preferably recorded prior to recording the servo signals. In a first writing pass along the record member 10, a writing transducer such as a write core 180 having a relatively wide gap on the order of 0.160 inches records synchronizing signals spaced, for example, 12 microseconds apart (0.01575 inch nominal at 750 inches per second speed of the record member). The location of the synchronizing signals in relation to the length of the record member 10, the precision of timing and the waveform are not critical. The adjacent servo tracks in each set, however, must have the synchronizing signals in phase and next to one another. This is accomplished by utilizing a wide write head gap and writing the synchronizing signals on all of the servo tracks 16 of each set simultaneously.

After the synchronizing signals are written, a transducer (not shown) having a relatively narrow gap on the order of 9 mils is used for writing the individual servo signals 112 as shown in FIG. 3. The predetermined number of the square wave pulses 122 are written between the synchronizing signals, depending upon available space and recovery time of the recording circuitry. Precision timing relationships must be maintained downstream of every new synchronizing signal. These timing relationships differ in phase by 90 electrical degrees from one servo track to the next, as described previously.

Where the servo signals have comprised a series of pulses, best results have been obtained by writing the servo signals as a series of sharp, single pulses (saturated recording) at a frequency where the pulses are reasonably well isolated from each other for detection purposes (relatively wide shoulders). If the servo signals comprise pulses, except for this limitation, the pulse shape and write current are not important as long as the write process remains constant during the writing of all of the servo tracks at a precise track pitch such as 0.009 mils.

The diagrammatic plots shown in FIGS. 8—11 are illustrative of the manner in which a servo signal arrangement such as is shown in FIG. 3 provides for the elimination of noise signals of varying form and frequency. Noise is typically not a serious problem among other reasons because of the filtering effect provided by the considerable difference in the frequency of the servo signals and the frequency of actual servo operation. These frequencies may differ, for example, by a factor of 1000, the servo signals typically having a frequency on the order of 500 kc. while servo correction of the headbar may occur at a frequency of 500 c.p.s. Nevertheless for certain applications the arrangement of FIG. 1 may prove to be unsatisfactory in the absence of the noise rejection provided by the servo signal arrangement of FIG. 3.

Figure 8A:
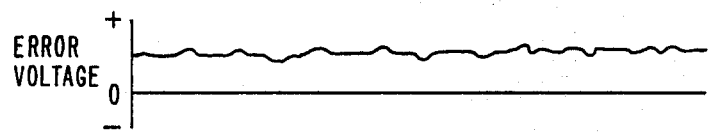
FIGS. 8a through 8d are graphical representations of a number of waveforms useful in explaining the manner in which noise signals of relatively high frequency may be rejected.
Figure 8B:
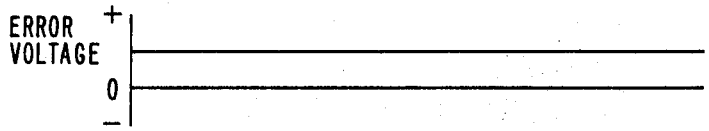
Figure 8C:
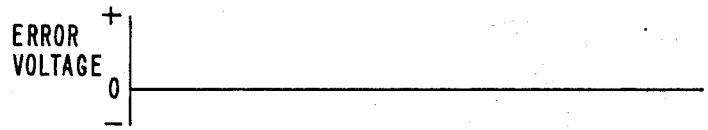
Figure 8D:

The diagrammatic plots of FIGS. 8a—8d illustrate the manner in which problems due to noise signals of relatively high frequency are eliminated by the servo signal arrangement of FIG. 3. Assuming that the frequency of the noise signal is not a multiple or harmonic of the servo signal frequency, such noise signal will randomly alter the amplitudes of the pulses 118, 120, 122 and 124 to provide an error voltage at the output of the summing network 168 as shown in FIG. 8a in the absence of the high frequency filter 30. With the filter 30 present however, substantially all of the noise signal is eliminated and the error voltage assumes the form shown in FIG. 8b. FIGS. 8a and 8b assume that the servo transducer is closer to the left servo track than to the right servo track thereby providing a positive error voltage at the output of the summing network 168. If the servo transducer is centered between the left and right servo tracks, the resulting error voltage is shown in FIGS. 8c and 8d, the plot of FIG. 8c representing the case where the noise filter 30 is present in the system and the plot of FIG. 8d representing the case where the filter is absent from the system.

Figure 9A:
FIG. 9a through 9c are graphical representations of a number of waveforms useful in explaining the manner in which noise signals of relatively low frequency may be rejected.
Figure 9B:
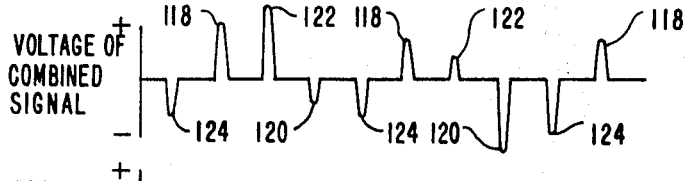
Figure 9C:
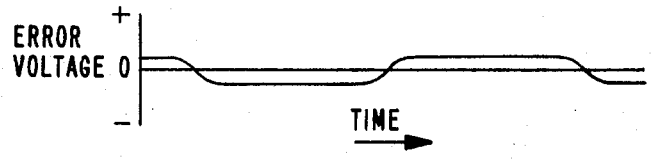

FIGS. 9a—9c illustrate the effect of noise signals of relatively low frequency on servosystems in accordance with the present invention. It is assumed that the noise signal voltage is of generally sinusoidal waveform, as illustrated in FIG. 9a, and that the servo transducer is centered between the servo tracks, dictating an error signal voltage of zero value under ideal conditions. The signal pulses 118, 120 and 122, 124, corresponding to the left and right servo tracks respectively, are of substantially equal amplitude and assume the form shown in FIG. 4 in the absence of the noise voltage of FIG. 9a. With the noise voltage present however, the first pair of positive pulses 118 and 122 are increased in amplitude by unequal amounts and the first pair of negative pulses 120 and 124 are decreased in amplitude by unequal amounts due to the positive portion of the noise voltage. During the negative portion of the generally sinusoidal noise voltage, the positive pulses 118 and 122 are decreased in amplitude by unequal amounts, while the negative pulses 120 and 124 are increased in amplitude by unequal amounts. Referring to FIG. 9c, it is seen that a negative error voltage of relatively low value is provided during the positive portion of the noise voltage, since the right track servo pulses 122 and 124 exceed in amplitude the left track pulses 118 and 120. During the negative excursion of the noise voltage, however, the amplitudes of the left servo track pulses 118 and 120 exceed those of the right servo track pulses 122 and 124, resulting in a positive error voltage of value substantially equal to the preceding negative portion. The slight positive and negative excursions of the error voltage, as shown in FIG. 9c, can be cancelled over a period of time without adversely affecting the precision of the system, thereby eliminating the effects of the noise signal.

Figure 10A:
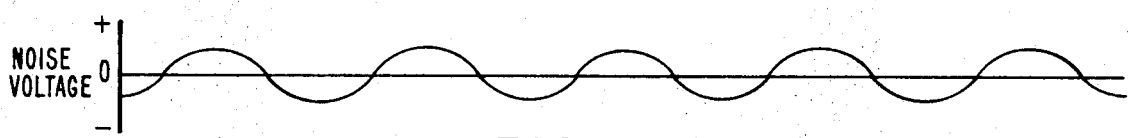
FIGS. 10a through 10c are graphical representations of a number of waveforms useful in explaining the manner in which noise signals having a frequency substantially equal to that of the servo signals may be rejected; and, FIGS. 11a through 11c are graphical representations of a number of waveforms useful in explaining the manner in which a DC noise signal may be rejected.
Figure 10B:
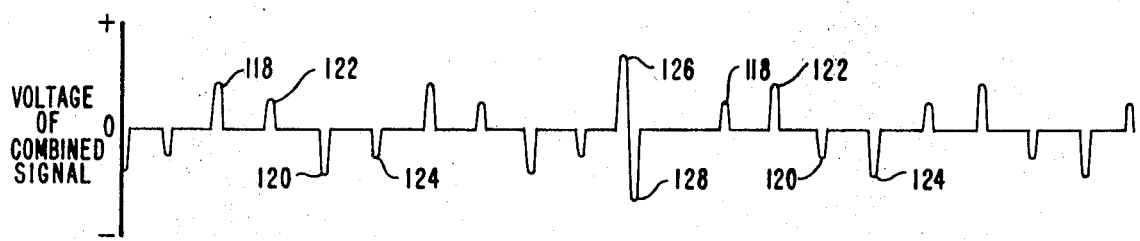
Figure 10C:
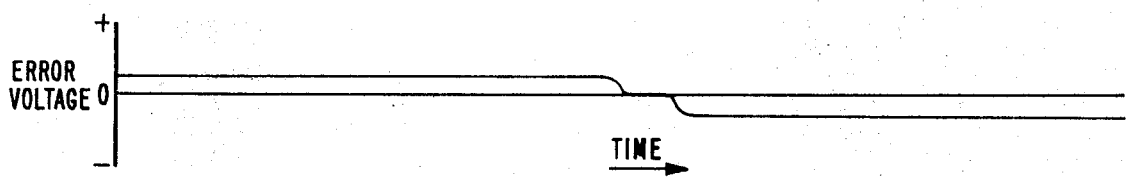

FIGS. 10a—10c depict the conditions which exist when the servo transducer is centered between the left and right servo tracks and a noise signal of frequency substantially equal to that of the servo track signals is present. The positive and negative pulses 118 and 120 corresponding to the left servo track have amplitudes greater than those of the pulses 122 and 124 corresponding to the right servo track prior to the occurrence of the synchronizing pulses 126 and 128. This results in a positive error voltage of relatively small value. Upon occurrence of the synchronizing pulses 126 and 128 however, the phase of the servo signals reverses, providing the left servo track pulses 118 and 120 with amplitudes less than those of the right servo track pulses 122 and 124. This results in a negative error voltage of value substantially equal to the preceding positive error voltage. Again, the effects of the noise voltage may be eliminated by cancelling the positive and negative excursions of the error voltage over a period of time, without adversely affecting the system precision. It will thus be seen that periodic phase reversals of the servo signals aid in the cancellation of unwanted noise signals having a frequency which is equal to or a multiple of or a submultiple of the servo track frequency.

Figure 11A:
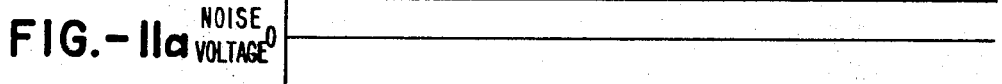
Figure 11B:
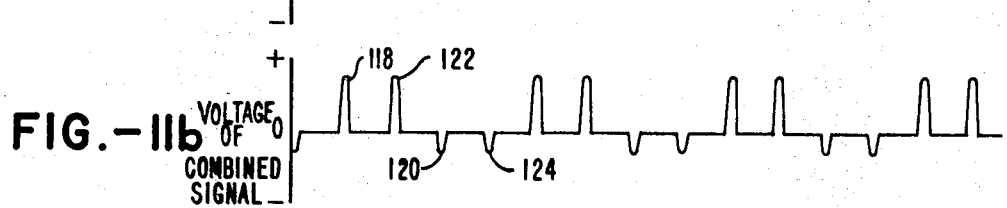
Figure 11C:
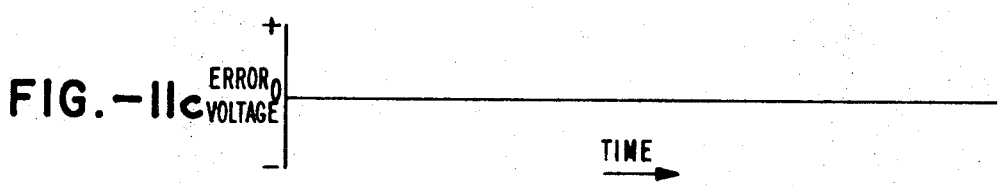

FIGS. 11a—11c depict conditions in which the servo transducer is centered between the left and right servo track and a +DC noise voltage is present. The amplitudes of the positive servo pulses 118 and 122 are increased by equal amounts due to the DC noise voltage and the amplitudes of the negative pulses 120 and 124 are decreased by equal amounts. Since the absolute value of the combined amplitudes of the pulses 118 and 120 is equal to that obtained by combining the amplitudes of the pulses 122 and 124, the inputs to the summing network 168 are equal and a condition of zero error voltage is provided as shown in FIG. 11c.

While the invention has been particularly shown and described with reference to preferred embodiments thereof, it will be understood by those skilled in the art that various changes in form and details may be made therein without departing from the spirit and scope of the invention.

I claim:

1. A system for aligning a selected one of a plurality of data transducers carried by a common mechanical element with a selected one of a plurality of data tracks on a record member which is movable relative to the mechanical element, said data transducers being disposed in spaced-apart relation and generally along a common axis, comprising the combination of a pair of servo transducers mounted on the mechanical element and disposed on the common axis at the opposite ends of the plurality of data transducers, a pair of servo track sets disposed along different portions of the record member adjacent respective ones of the pair of servo transducers, means coupled to each of the servo transducers for generating an error signal representing the deviation of the servo transducer from an imaginary line extending along the associated servo track set, and elongated resistive means coupled to receive the error signals at the opposite ends thereof and providing a single error signal at a terminal which is located relative to the opposite ends so as to represent the relative distances along the mechanical element from the selected one of the data transducers to the pair of servo transducers.

2. A system in accordance with claim 1, further comprising means coupled to said terminal for biasing said terminal in accordance with the difference between the actual location of the selected one of the plurality of data transducers and a desired location thereof.

3. A system for aligning a particular one of a plurality of data transducers which are spaced along the length of a common mechanical element with a selected one of a plurality of data tracks on a record member which is movable in a direction generally normal to the length of the mechanical element, comprising the combination of a pair of servo transducers mounted on the mechanical element adjacent the respective ends of the length thereof, two sets of servo tracks disposed along different portions of the record member, each servo track set having at least two servo tracks which are located adjacent to and on the opposite sides of a different one of the pair of servo transducers, separate means coupled to each of the servo transducers for generating an error signal representative of the misalignment of the servo transducer from an imaginary center line between the two servo tracks, means coupled to receive the error signals from the two different servo transducers for attenuating the error signals in proportion to the distances of the respective associated servo transducers from the particular one of the data transducers, means for combining the attenuated error signals to form a single error signal, and means for laterally positioning the mechanical element relative to the record member in accordance with the single error signal.

4. A system in accordance with claim 3, wherein the means for attenuating the error signals, and the means for combining the error signals together comprise a plurality of resistors coupled in series, each of the resistors representing the physical distance between an adjacent pair of transducers on the mechanical element with the junction between each adjacent pair of resistors corresponding to the physical location of a particular transducer along the length of the mechanical element, means coupling each of the opposite ends of the series combination of resistors to receive a different one of the error signals, and means coupling the junction corresponding to the particular one of the data transducers to the means for laterally positioning the mechanical element.

5. A system in accordance with claim 4, further comprising a printed circuit for imposing a selected bias voltage at each of the junctions between adjacent pairs of resistors to compensate for mislocations of the corresponding transducers along the length of the mechanical element, said printed circuit comprising opposite common buses coupled to respective ones of a pair of voltage sources and conductor means selectively coupling the junctions to the common buses, and further including a resistor coupled between each of selected ones of the junctions and one of the common buses.

6. A system in accordance with claim 4, further comprising means coupled to at least one of the junctions between adjacent pairs of resistors for imposing thereon a bias voltage, the magnitude and sense of which respectively represent the amount and direction of mislocation of the corresponding transducer from a desired position along the length of the mechanical element.

7. A system in accordance with claim 6, wherein the means for imposing a bias voltage comprises a pair of voltage sources, a resistor coupled between one of the voltage sources and the junction, and a variable resistor coupled between the other one of the voltage sources and the junction.

8. A system in accordance with claim 3, wherein said at least two servo tracks have servo signals of like frequency and different phase recorded therealong, the signals in the two different servo tracks presenting successive pairs of alternately positive-going and negative-going signal excursions to the associated servo transducers in response to movement of the record member relative to the common mechanical element.

9. A system in accordance with claim 8, wherein the servo signals reverse in phase at intervals along the lengths of the servo tracks.

10. A system in accordance with claim 9, wherein the servo signals are displaced in phase by 90 electrical degrees relative to one another.

11. A servosystem for aligning a selected one of a plurality of data transducers spaced along the length of a common mechanical element with a selected one of a plurality of data tracks disposed on a record member which is movable relative to the mechanical element, comprising the combination of a pair of servo transducers mounted at the opposite ends of the mechanical element, a pair of servo track sets disposed along the record member, each of the servo track sets being associated with a different one of the servo transducers and having a plurality of spaced apart servo tracks, each adjacent pair of the servo tracks having recorded thereupon signals of like frequency but different phase, means for initially adjusting the lateral position of the mechanical element relative to the record member to position each of the servo transducers adjacent to and between a selected adjacent pair of the servo tracks in the associated servo track set, means coupled to each of the servo transducers for generating an error signal representative of the direction and degree of displacement of the transducer from an imaginary center line between the selected adjacent pair of the servo tracks, an actuator for laterally positioning the mechanical element relative to the record member in response to an applied signal, a serial combination of resistors coupled to receive the error signals at the opposite ends thereof, a selecting switch having a plurality of terminals coupled to different ones of the junctions between adjacent pairs of resistors in the serial combination and a wiper arm coupled to the actuator, and means providing a bias voltage of selected magnitude and sense at each of the junctions between adjacent pairs of resistors.

12. A data transducer positioning servosystem comprising a common mechanical element, a record member movable relative to the common mechanical element and having at least one data track thereon and servo signals of like frequency recorded thereon along at least two spaced apart servo tracks, at least one data transducer mounted on the common mechanical element, at least one servo transducer mounted on the common mechanical element for simultaneously sensing the servo signals in the at least two spaced apart servo tracks, said servo signals being displaced in phase relative to one another so as to present successive pairs of alternately positive-going and negative-going signal excursions to the servo transducer in response to movement of the record member relative to the common mechanical element, and means coupled to the servo transducer and responsive to the signal excursions in the two spaced apart servo tracks for generating an error signal representative of the location of the servo transducer relative to the servo tracks.

13. A data transducer positioning servosystem in accordance with claim 12, wherein said servo signals are displaced in phase by 90 electrical degrees relative to one another.

14. A data transducer positioning servosystem in accordance with claim 12, wherein the servo transducer comprises a magnetic head, the record member has a magnetizable surface portion on which the servo tracks are disposed, and the servo signals comprise pulses of substantially rectangular waveform recorded by magnetic saturation of alternate sense along the lengths of the servo tracks.

15. A data transducer positioning servosystem in accordance with claim 12, wherein said servo signals reverse in phase at intervals along the length of the servo tracks.

16. A data transducer positioning servosystem in accordance with claim 12, wherein the servo transducer responds to movement of the record member relative to the common mechanical element by generating a combined signal comprising two different sets of components respectively representative of the strength of the positive-going and negative-going signal excursions of each of the two different servo signals at the servo transducer, and wherein the means for generating an error signal comprises means coupled to receive the combined signal for separating the two different sets of components, means responsive to each of the two different sets of components for generating a signal amplitude representative of the amplitudes of the components in each set, and means for combining the signal amplitudes from the two different sets of components to provide the error signal.

17. A data transducer positioning servosystem in accordance with claim 16, further including synchronizing pulses recorded in spaced apart relation along the lengths of the servo tracks and in phase with one another, each of the synchronizing pulses initiating a reversal in phase of that portion of the servo signal which immediately follows the pulse.

18. A data transducer positioning servosystem in accordance with claim 17, wherein the means for separating the two different sets of components comprises timing means responsive to each occurrence of synchronizing pulses at the servo transducer for initiating a timing sequence, and gating means responsive to the timing sequence for alternately gating the components of the combined signal into either of two different electrical channels, and wherein the means for generating a signal amplitude comprises separate means within each of the two different electrical channels for integrating the components gated into the associated channel.

19. A servosystem for aligning a plurality of magnetic data heads carried by an elongated headbar with selected ones of a plurality of parallel data tracks disposed along the recording surface of a generally rectangular magnetic strip record member which is movable relative to the headbar, the data tracks being generally parallel with the direction of movement of the strip record member, comprising the combination of a plurality of generally parallel servo tracks disposed along the recording surface of the strip record member in a direction generally parallel with the direction of movement of the strip record member, servo signals of like frequency magnetically recorded along each of the servo tracks, each of said servo signals differing in phase with the servo signals in the immediately adjacent servo tracks and all servo signals reversing phase at locations spaced along the length of the servo tracks, a magnetic servo head mounted on the headbar, said servo head being initially positioned between a selected adjacent pair of the servo tracks to position the date heads adjacent the selected ones of the data tracks and subsequently sensing the servo signals recorded along the pair of servo tracks to generate a sequence of signal components alternately representative of the two different servo signals in response to motion of the strip record member relative to the headbar, means responsive to the amplitudes of alternate ones of the signal components for generating a first signal having an amplitude representative thereof and a given sense, means responsive to the amplitudes of the remaining ones of the signal components for generating a second signal having an amplitude representative thereof and a given sense, means responsive to the amplitudes of the remaining ones of the signal components for generating a second signal having an amplitude representative thereof and a sense opposite the given sense of the first signal, and means for algebraically summing the first and second signals to provide an error signal, the sense of which represents the direction in which the servo head is located relative to an imaginary center line between the selected adjacent pair of servo tracks and the magnitude of which represents the distance between the servo head and the imaginary center line.